US009740058B2

(12) United States Patent
Hwang et al.

(10) Patent No.: US 9,740,058 B2
(45) Date of Patent: Aug. 22, 2017

(54) LIQUID CRYSTAL DISPLAY DEVICE

(71) Applicants: Samsung Display Co., Ltd, Yongin, Gyeonggi-Do (KR); Pusan National University Industry-University Cooperation Foundation, Busan (KR)

(72) Inventors: Tae Hyung Hwang, Seoul (KR); Seong Su Lim, Seoul (KR); Jung Wook Kim, Busan (KR); Tae Hoon Yoon, Busan (KR)

(73) Assignees: SAMSUNG DISPLAY CO., LTD., Gyeonggi-do (KR); PUSAN NATIONAL UNIVERSITY INDUSTRY-UNIVERSITY COOPERATION FOUNDATION, Busan (KR)

( * ) Notice: Subject to any disclaimer, the term of this patent is extended or adjusted under 35 U.S.C. 154(b) by 218 days.

(21) Appl. No.: 14/550,391

(22) Filed: Nov. 21, 2014

(65) Prior Publication Data

US 2015/0185563 A1    Jul. 2, 2015

(30) Foreign Application Priority Data

Dec. 31, 2013    (KR) ........................ 10-2013-0169364

(51) Int. Cl.
*G02F 1/136*      (2006.01)
*G02F 1/1335*     (2006.01)
(Continued)

(52) U.S. Cl.
CPC .............................. *G02F 1/134336* (2013.01)

(58) Field of Classification Search
CPC ............. G02F 1/134336; G02F 1/1368; G02F 1/13528; G02F 1/13345; G02F 1/13439
See application file for complete search history.

(56) References Cited

U.S. PATENT DOCUMENTS 6,005,650 A * 12/1999 Kim .................. G02F 1/134363
349/117
2007/0115234 A1    5/2007 Kim et al.
(Continued)

FOREIGN PATENT DOCUMENTS

JP    2009134228 A    6/2009
JP    2011123234 A    6/2011
(Continued)

OTHER PUBLICATIONS

Mi Hyeon Jo, et al., "Electro-optic characteristics of the fringe in-plane switching liquid crystal device for a liquid crystal with negative dielectric anisotropy", Liquid Crystals, vol. 40, No. 3, p. 368-373, 2013.
(Continued)

*Primary Examiner* — Huyen Ngo
(74) *Attorney, Agent, or Firm* — Cantor Colburn LLP

(57) ABSTRACT

A display device includes: a first substrate; a second substrate disposed opposite to the first substrate; a first electrode and a second electrode disposed on the first substrate; a third electrode and a fourth electrode disposed on the second substrate; and a liquid crystal layer injected between the first substrate and the second substrate and including a plurality of liquid crystal molecules, where the second electrode extends substantially in a first direction, the third electrode extends substantially in a second direction, and the first direction and the second direction are perpendicular to each other.

7 Claims, 12 Drawing Sheets

(51) Int. Cl.
    *G02F 1/1333*    (2006.01)
    *G02F 1/1343*    (2006.01)

(56) References Cited

U.S. PATENT DOCUMENTS

| | | | |
|---|---|---|---|
| 2008/0001873 A1 | 1/2008 | Choi | |
| 2011/0155989 A1* | 6/2011 | Park | H01L 45/06 257/3 |
| 2011/0285689 A1 | 11/2011 | Kim et al. | |
| 2012/0162559 A1* | 6/2012 | Kim | G02F 1/134363 349/42 |
| 2012/0300144 A1* | 11/2012 | Lee | G02F 1/139 349/33 |
| 2013/0033663 A1 | 2/2013 | Tago et al. | |
| 2013/0050601 A1 | 2/2013 | Takeda et al. | |

FOREIGN PATENT DOCUMENTS

| | | |
|---|---|---|
| KR | 1020080002436 A | 1/2008 |
| KR | 1020080054940 A | 6/2008 |
| KR | 1020110010429 A | 2/2011 |
| KR | 1020120064861 A | 6/2012 |

OTHER PUBLICATIONS

Kyung Su Ha, et al., "Study of Optical Bounce According to Electrode Structure in the Fringe-Field Switching Mode Using the Negative Liquid Crystal", Mol. Cryst. Liq. Cryst., vol. 544, pp. 69-76, 2011.

* cited by examiner

LIQUID CRYSTAL DISPLAY DEVICE

This application claims priority to Korean Patent Application No. 10-2013-0169364 filed on Dec. 31, 2013, and all the benefits accruing therefrom under 35 U.S.C. §119, the content of which in its entirety is herein incorporated by reference.

BACKGROUND (a) Field

Exemplary embodiments of the invention relates to a display device.

(b) Description of the Related Art

A liquid crystal display ("LCD") is one of the most widely used types of flat panel display, and the LCD rearranges liquid crystal molecules of a liquid crystal layer by applying a voltage to electrodes therein, thereby adjusting an amount of transmitted light.

A method for increasing transmittance and implementing a wide viewing angle of an LCD, in which a pixel electrode and a common electrode are provided on one substrate, has received attention.

The LCD, in which the pixel electrode and the common electrode are on one substrate, is applied with a method of rotating liquid crystal molecules arranged in a direction substantially parallel to the substrate surface by using an electric field formed in a horizontal direction.

Recently, as electronic devices have been developed, display devices included in such electronic devices typically operate with a fast response speed.

SUMMARY

Exemplary embodiments of the invention relate to a display device having a fast response speed with high transmittance and wide viewing angle.

An exemplary embodiment of a display device according to the invention includes: a first substrate; a second substrate disposed opposite to the first substrate; a first electrode disposed on the first substrate; a second electrode disposed on the first substrate; a third electrode disposed on the second substrate; a fourth electrode disposed on the second substrate; and a liquid crystal layer injected between the first substrate and the second substrate and including a plurality of liquid crystal molecules, where the second electrode extends substantially in a first direction, the third electrode extends substantially in a second direction, and the first direction and the second direction are perpendicular to each other.

In an exemplary embodiment, the first electrode and the second electrode may extend parallel to each other substantially in the first direction with a first interval therebetween, and the third electrode and the fourth electrode may extend parallel to each other substantially in the second direction with a second interval therebetween.

In an exemplary embodiment, the first interval between the first electrode and the second electrode may be less than about 6 micrometers (μm), and the second interval between the third electrode and the fourth electrode may be less than about 6 μm.

In an exemplary embodiment, a width of the first electrode and a width of the second electrode may be substantially equal to or different from the first interval, and a width of the third electrode and a width of the fourth electrode may be substantially equal to or different from the second interval.

In an exemplary embodiment, the display device may further include an insulating layer disposed on the first substrate, the first electrode and the second electrode may overlap each other via the insulating layer, the first electrode may have a plate shape, the second electrode may include a plurality of branch electrodes extending parallel to each other substantially in the first direction with a first interval therebetween, and the third electrode and the fourth electrode may extend parallel to each other substantially in the second direction with a second interval therebetween.

In an exemplary embodiment, the display device may further include: a first thin film transistor disposed on the first substrate; and a second thin film transistor disposed on the second substrate, where at least one of the first electrode and the second electrode may be connected to the first thin film transistor, and at least one of the third electrode and the fourth electrode may be connected to the second thin film transistor.

In an exemplary embodiment, the liquid crystal molecules may have negative dielectric anisotropy or positive dielectric anisotropy, and the liquid crystal molecules may be arranged substantially parallel to surfaces of the first substrate and the second substrate.

In an exemplary embodiment, the display device may further include: a first polarizer disposed outside the first substrate; and a second polarizer disposed outside the second substrate, and when an electric field is not applied to the liquid crystal layer, a longitudinal axis of the liquid crystal molecule may be arranged substantially parallel to a polarization axis of the first polarizer or the second polarizer.

According to exemplary embodiments of the display device according to the invention, a response speed is improved while effectively minimizing a reduction in transmittance and realizing a wide viewing angle.

BRIEF DESCRIPTION OF THE DRAWINGS

The above and other features of the invention will become more apparent by describing in further detail exemplary embodiments thereof with reference to the accompanying drawings, in which.

DETAILED DESCRIPTION

Figure 1:
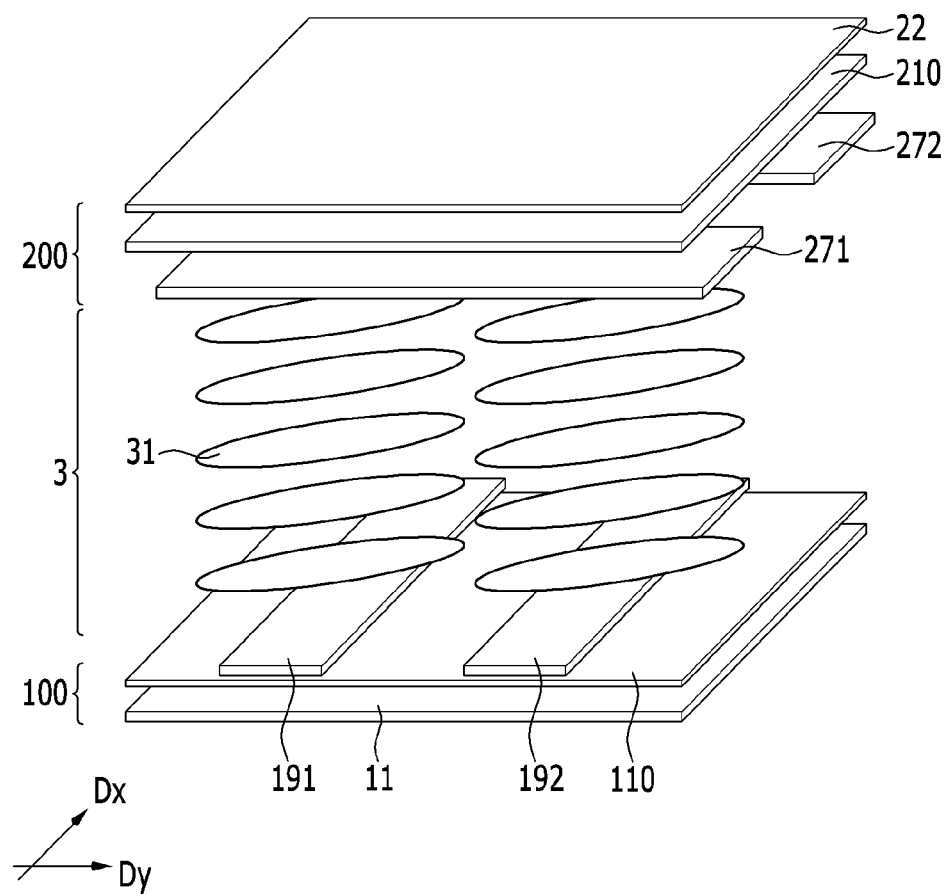
FIG. 1 is a schematic view of an exemplary embodiment of a display device according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereafter, exemplary embodiments of a display device according to the invention will be described in detail with reference to accompanying drawings.

Firstly, an exemplary embodiment of a display device according to the invention will be described with reference to FIG. 1. FIG. 1 is a schematic view of an exemplary embodiment of a display device according to the invention.

Referring to FIG. 1, an exemplary embodiment of a display device according to the invention includes a first display panel 100 and a second display panel 200 disposed opposite to the first display panel 100, and a liquid crystal layer 3 disposed between the first display panel 100 and the second display panel 200.

The first display panel 100 includes a first substrate 110, and a first electrode 191 and a second electrode 192 disposed on the first substrate 110. In an exemplary embodiment, the first electrode 191 and the second electrode 192 are alternately disposed on the first substrate 110.

In an exemplary embodiment, although not shown in the figures, the first display panel 100 may further include signal lines such as a gate line and a data line, and a thin film transistor connected to the signal lines, which are disposed on the first substrate 110. In such an embodiment, at least one of the first electrode 191 and the second electrode 192 may be connected to an output terminal of a switching element such as a thin film transistor.

The first electrode 191 and the second electrode 192 may have a predetermined width and extend substantially in a first direction Dx with a predetermined interval therebetween. The interval between adjacent first and second electrodes 191 and 192 may be less than about 6 micrometers (μm). The width of the first electrode 191 and the width of the second electrode 192 may be substantially equal to or different from the interval between the adjacent first and second electrodes 191 and 192.

The second display panel 200 includes a second substrate 210, and a third electrode 271 and a fourth electrode 272 disposed on the second substrate 210.

In an exemplary embodiment, the third electrode 271 and the fourth electrode 272 are alternately disposed on the second substrate 210.

In an exemplary embodiment, although not shown in the figures, the second display panel 200 may further include signal lines such as a gate line and a data line and a thin film transistor connected to the signal lines, which are disposed on the second substrate 210. In such an embodiment, the third electrode 271 and the fourth electrode 272 may be respectively connected to an output terminal of a switching element such as the thin film transistor.

The third electrode 271 and the fourth electrode 272 have a predetermined width and extend substantially in a second direction Dy with a predetermined interval therebetween. The extending second direction Dy of the third electrode 271 and the fourth electrode 272 may be substantially perpendicular to the extending first direction Dx of the first electrode 191 and the second electrode 192. The interval between the adjacent third electrode 271 and fourth electrode 272 may be less than about 6 μm. The width of the third electrode 271 and the width of the fourth electrode 272 may be substantially equal to or different from the interval between the adjacent third electrode 271 and fourth electrode 272.

In an exemplary embodiment, although not shown in the figures, a color filter may be further provided on the first substrate 110 or the second substrate 210. Each color filter may express one of three primary colors, e.g., three primary color of red, green and blue or three primary colors of yellow, cyan and magenta. In such an embodiment, each pixel may represent a mixed color of the primary colors or white as well as the primary colors.

In an exemplary embodiment, the display device may further include a first polarizer 11 disposed outside the first display panel 100, and a second polarizer 22 disposed outside the second display panel 200.

In such an embodiment, polarization axes of the first polarizer 11 and the second polarizer 22 may cross each other.

The liquid crystal layer 3 includes a plurality of liquid crystal molecules 31, and the plurality of liquid crystal molecules 31 are arranged substantially parallel to surfaces of the first substrate 110 and the second substrate 210 and are initially aligned in a predetermined direction. Accordingly, in a state that the electric field is not applied to the liquid crystal layer 3, the liquid crystal molecules 31 are arranged in the predetermined direction.

The predetermined direction in which the liquid crystal molecules 31 are initially arranged may be substantially parallel to the polarization axis of one of the first polarizer 11 and the second polarizer 22, and may be substantially perpendicular to the polarization axis of the other of the first polarizer 11 and the second polarizer 22.

The liquid crystal layer 3 may have negative dielectric anisotropy or positive dielectric anisotropy.

Figure 2:
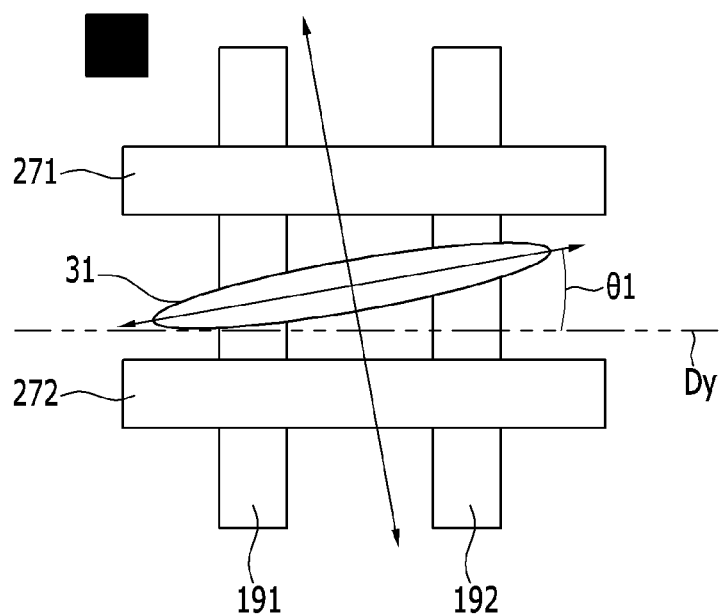
FIG. 2 to FIG. 4 are schematic views showing an exemplary embodiment of a driving method of the display device of FIG. 1.
Figure 3:
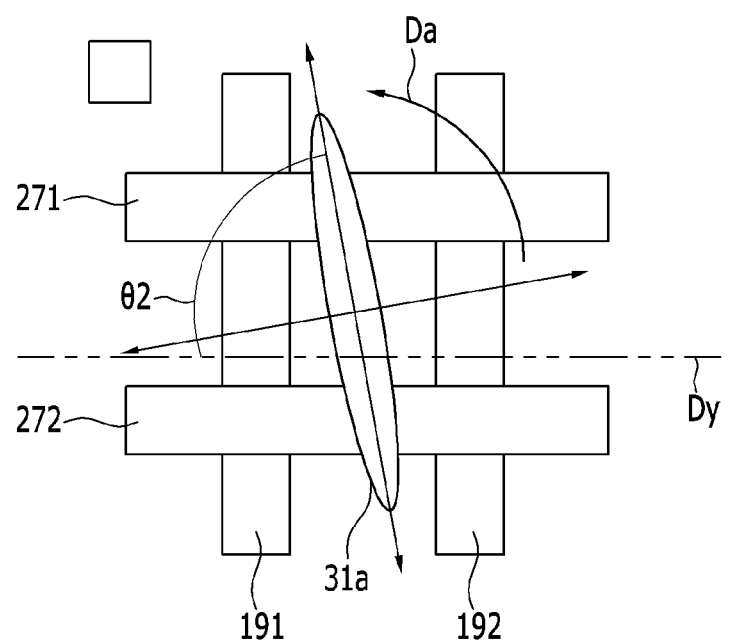
Figure 4:
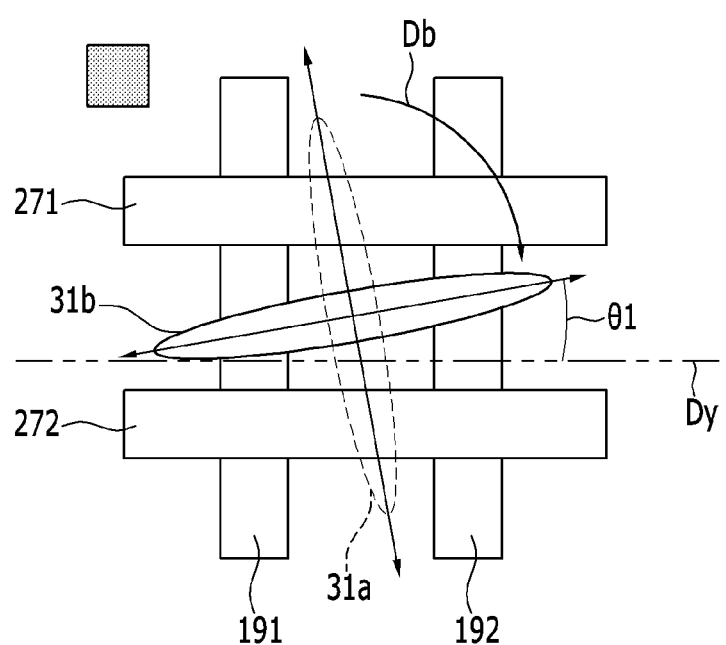

Next, an exemplary embodiment of a driving method of a display device shown in FIG. 1 will be described with reference to FIG. 2 to FIG. 4. FIG. 2 to FIG. 4 are schematic views showing an exemplary embodiment of a driving method of the display device of FIG. 1.

FIG. 2 shows a first off-state, e.g., an initial off-state. Referring to FIG. 2, the liquid crystal molecules 31 are aligned to form a first angle θ1 with the second direction Dy in which the third electrode 271 and the fourth electrode 272 of the second display panel 100 extend. As described above, the direction in which the liquid crystal molecules 31 are initially arranged may be substantially parallel to the polarization axis of one of the first polarizer 11 and the second polarizer 22 and may be substantially perpendicular to the polarization axis of the other of the first polarizer 11 and the second polarizer 22.

Accordingly, the light incident toward the first display panel 110 after passing through the first polarizer 11 is not transmitted through the liquid crystal layer 3 and the second polarizer 22 such that a black state (indicated by the black box) is displayed when the liquid crystal molecules 31 are initially arranged.

Next, referring to FIG. 3, an on-state of the display device will be described.

In the on-state of the display device, the first electrode 191 is applied with a first voltage and the second electrode 192 is applied with a second voltage. Magnitudes of the first voltage and the second voltage may be different from each other. In one exemplary embodiment, for example, the first voltage may be a pixel voltage and the second voltage may be a common voltage. In an alternative embodiment, the first voltage may be the common voltage and the second voltage may be a pixel voltage.

In the on-state of the display device, the third electrode 271 and the fourth electrode 272 of the second display panel 200 may be applied with the voltage of the predetermined magnitude, for example, the common voltage.

Referring to FIG. 3, when the first voltage and the second voltage having the different magnitudes are applied to the first electrode 191 and the second electrode 192, respectively, a horizontal electric field is applied to the liquid crystal layer 3, such that the liquid crystal molecules 31 are rotated in a third direction Da to form a second angle θ2 with the second direction Dy.

In an exemplary embodiment where the liquid crystal molecules 31 have the negative dielectric anisotropy, the liquid crystal molecules 31 are rotated in a direction such that the direction of the longitudinal axis of the liquid crystal molecules 31 is substantially perpendicular to the direction of the electric field of the horizontal direction applied to the liquid crystal layer 3. In an exemplary embodiment, where the liquid crystal molecules 31 have the positive dielectric anisotropy, the liquid crystal molecules 31 are rotated in a direction such that the direction of the longitudinal axis of the liquid crystal molecules 31 is substantially parallel to the direction of the electric field of the horizontal direction applied to the liquid crystal layer 3.

In such an embodiment, as the liquid crystal molecules 31 are rotated, the light incident toward the first display panel 110 after passing through the first polarizer 11 is transmitted through the liquid crystal layer 3 and the second polarizer 22 such that a predetermined brightness is displayed.

Next, referring to FIG. 4, a second off-state of the display device will be described.

In a case of the second off-state of the display device, the third electrode 271 is applied with a third voltage and the fourth electrode 272 is applied with a fourth voltage. The magnitudes of the third voltage and the fourth voltage may be different from each other. The third voltage and the fourth voltage may be voltages having different polarities with reference to the common voltage. In the second off-state, the first electrode 191 and the second electrode 192 may be applied with the voltage of the predetermined magnitude, for example, the common voltage.

Referring to FIG. 4, when the third voltage and the fourth voltage having the different magnitudes are applied to the third electrode 271 and the fourth electrode 272, the horizontal electric field is applied to the liquid crystal layer 3, such that the liquid crystal molecules 31 are rotated in a fourth direction Db, e.g., a direction opposite to the third direction Da, to form the first angle θ1 with the second direction Dy, as the first liquid crystal molecules 31a are rotated toward the second liquid crystal molecules 31b.

The direction of the electric field by the third voltage and the fourth voltage applied to the third electrode 271 and the fourth electrode 272 is substantially perpendicular to the direction of the electric field formed by the first voltage and the second voltage applied to the first electrode 191 and the second electrode 192. Accordingly, the liquid crystal molecules 31 are rotated in the direction, e.g., the fourth direction Db, opposite to the direction shown in FIG. 3, e.g., the third direction DA. In such an embodiment, as described above, as the liquid crystal molecules 31 are rotated in the fourth direction Db, the light incident toward the first display panel 110 after passing through the first polarizer 11 is not transmitted through the liquid crystal layer 3 and the second polarizer 22 such that the black state is displayed.

Figure 5:
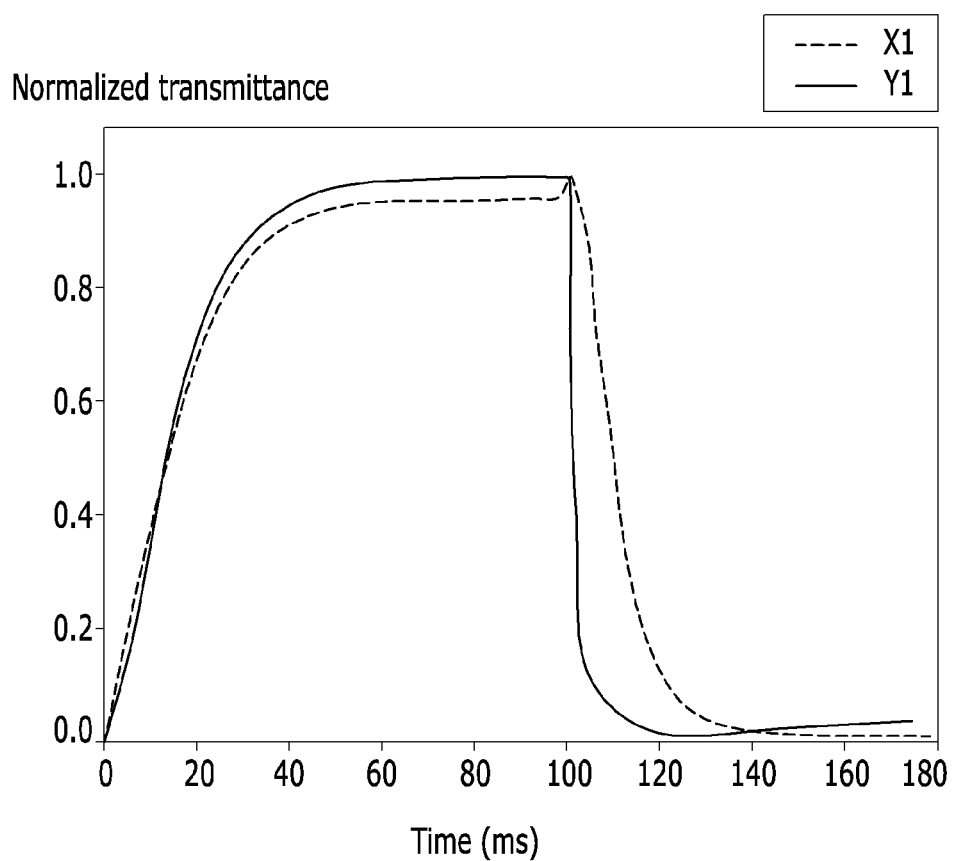
FIG. 5 is a graph showing a result of an experiment on a conventional display device and an exemplary embodiment of a display device according to the invention.

Next, an experimental example of the invention will be described with reference to FIG. 5 and Table 1. FIG. 5 is a graph showing a result of an experiment on a conventional display device and an exemplary embodiment of a display device according to the invention, and Table 1 is a graph showing a result of a response time based on the experiment.

In an experiment, the response speed of a conventional display device, in which the first electrode and the second electrode are provided on the first display panel and no electrode is provided on the second display panel, and the response speed of an exemplary embodiment of a display device according the invention, in which the first electrode and the second electrode are provided on the first display panel and the third electrode and the fourth electrode are provided on the second display panel, are measured, and the results thereof are shown in FIG. 5.

In FIG. 5, X1 represents the result of the conventional display device, and Y1 represents the result of the exemplary embodiment of the display device according to the invention.

TABLE 1

|    | Turn-on time        | Turn-off time |
|----|---------------------|---------------|
| X1 | 26.0 milliseconds (ms) | 16.4 ms       |
| Y1 | 25.4 ms             | 4.5 ms        |

Referring to Table 1 and FIG. 5, in an exemplary embodiment of the display device according to the invention, compared with the conventional display device, a response time for changing the brightness from transmittance of zero (0) to a predetermined transmittance (e.g., a transmittance of about 0.5) is reduced, and a response time for changing the brightness from a high transmittance (e.g., a transmittance of about 1) to the transmittance of zero (0) is further reduced. That is, in an exemplary embodiment of the display device according to the invention, compared with the conventional display device, the response time is decreased, and the response speed is thereby increased. In such an embodiment of the display device according to the invention, the turn-off time is substantially short compared with the conventional display device.

Figure 6:
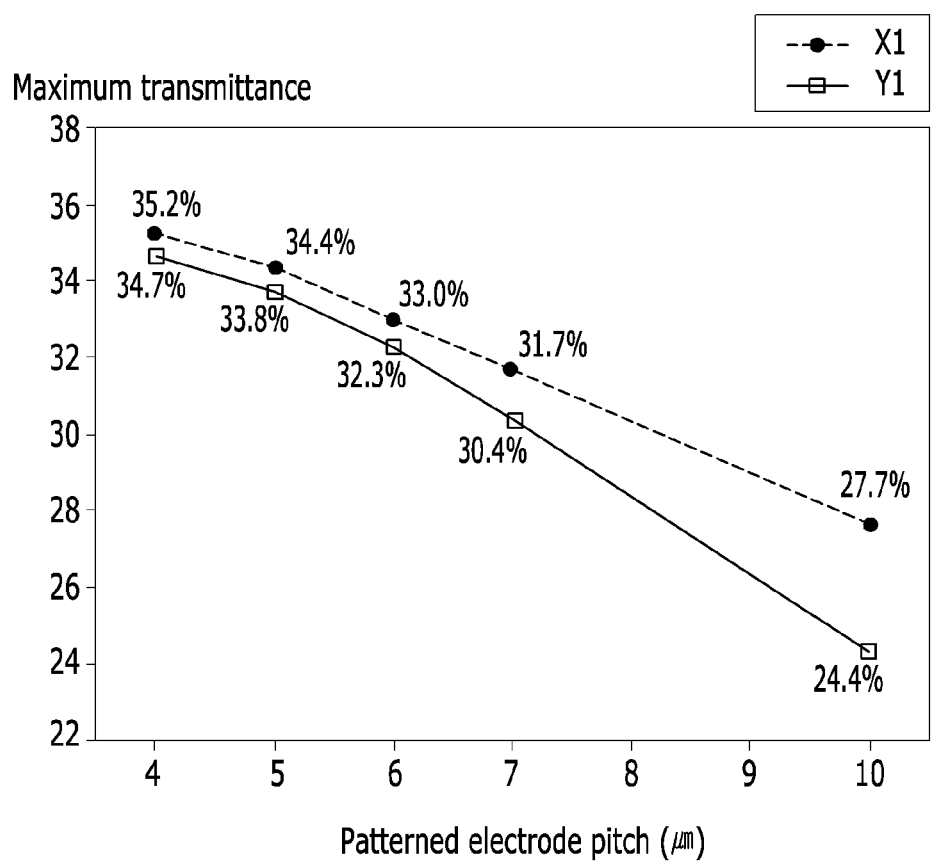
FIG. 6 is a graph showing a result of another experiment on a conventional display device and an exemplary embodiment of a display device according to the invention.

Next, another experiment on an exemplary embodiment of the invention will be described with reference to FIG. 6. FIG. 6 is a graph showing a result of another experiment on an exemplary embodiment of the invention.

In an experiment, a transmittance change of a conventional display device, in which the first electrode and the second electrode are provided on the first display panel and an electrode is not provided on the second display panel, and a transmittance change of an exemplary embodiment of the display device according to the invention, in which the first electrode and the second electrode are provided on the first display panel and the third electrode and the fourth electrode are provided on the second display panel, are measured while controlling an interval between the electrodes.

In FIG. 6, X1 represents the result of the conventional display device, and Y1 represents the result of the exemplary embodiment of the display device according to the invention. Referring to FIG. 6, in an exemplary embodiment of the display device according to the invention, when the interval between the electrodes is less than about 6 μm, a maximum transmittance reduction of the display device compared with the conventional display device is substantially. That is, in an exemplary embodiment of the display device according to the invention, when the interval between the electrodes is less than about 6 μm, the maximum transmittance reduction of the display device is substantially decreased or effectively minimized, while the response speed may be substantially improved compared with the conventional display device.

Next, an alternative exemplary embodiment of a display device according to the invention will be described with reference to FIG. 7.

Figure 7:
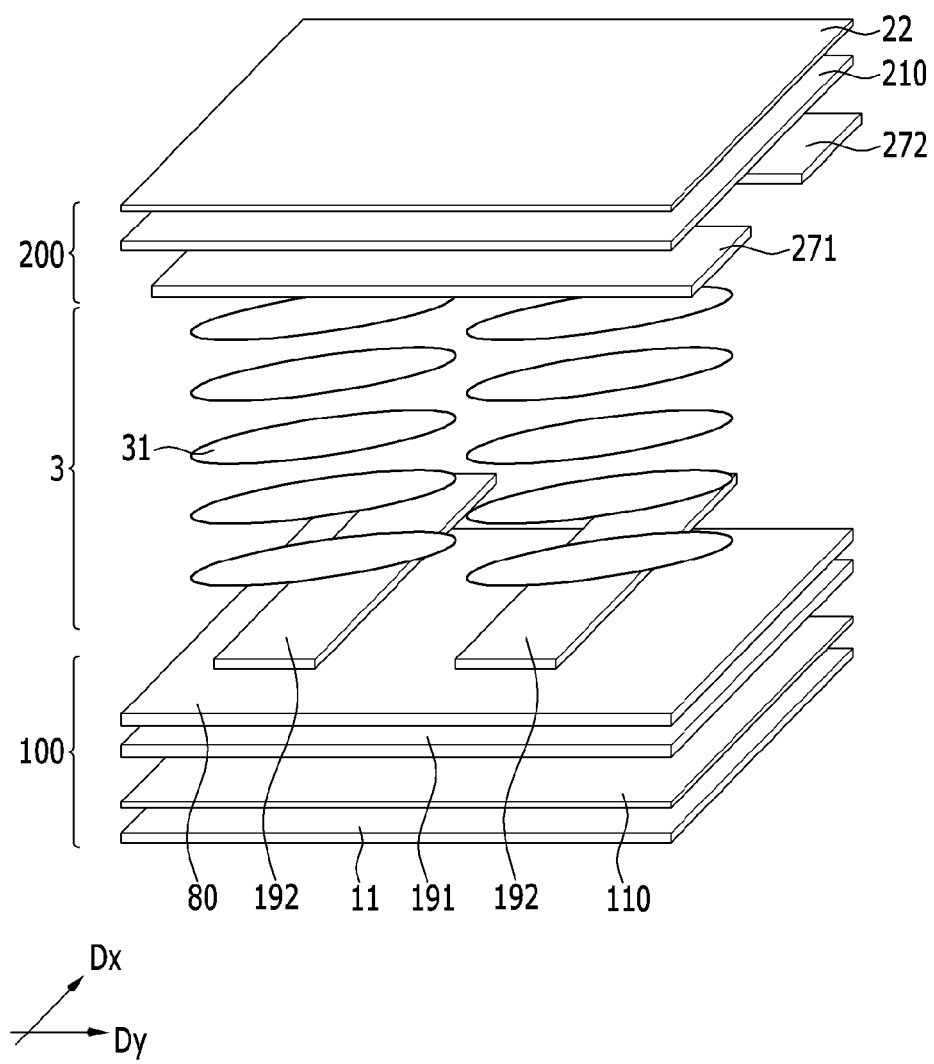
FIG. 7 is a schematic view of an alternative exemplary embodiment of a display device according to the invention.

Referring to FIG. 7, an alternative exemplary embodiment of a display device according to the invention includes a first display panel 100, a second display panel 200 disposed opposite to the first display panel 100, and a liquid crystal layer 3 disposed between the first display panel 100 and the second display panel 200.

The first display panel 100 includes a first substrate 110, and a first electrode 191 and a second electrode 192 disposed on the first substrate 110.

In an exemplary embodiment, as shown in FIG. 7, the first electrode 191 may have a plate shape and may be disposed to cover substantially a whole surface of the display device. In such an embodiment, an insulating layer 80 is disposed on the first electrode 191, and the second electrodes 192 are disposed on the insulating layer 80.

The second electrodes 192 include a plurality of branch electrodes extending substantially in the first direction Dx, where the branch electrodes may have a predetermined width and arranged with a predetermined interval therebetween. The interval between two adjacent second electrodes 192 (e.g., two adjacent branch electrodes) may be less than about 6 μm. The width of the second electrode 192 may be substantially equal to or different from the interval between the two adjacent second electrodes 192.

In an exemplary embodiment, although not shown in the figures, the first display panel 100 may further include signal lines such as a gate line and a data line and a thin film transistor connected to the signal lines, which are disposed on the first substrate 110. In such an embodiment, at least one of the first electrode 191 and the second electrode 192 may be connected to an output terminal of a switching element such as a thin film transistor.

The second display panel 200 includes a second substrate 210, and a third electrode 271 and a fourth electrode 272 disposed on the second substrate 210. In such an embodiment, although not shown in the figures, the second display panel 200 may further include signal lines such as a gate line and a data line and a thin film transistor connected to the signal lines, which are disposed on the second substrate 210. In such an embodiment, each of the third electrode 271 and the fourth electrode 272 may be connected to the output terminal of the switching element such as the thin film transistor.

The third electrode 271 and the fourth electrode 272 extend substantially in a second direction Dy with a predetermined width and a predetermined interval therebetween. The extending direction, e.g., the second direction Dy, of the third electrode 271 and the fourth electrode 272 may be substantially perpendicular to the extending direction, e.g., the first direction Dx, of the first electrode 191 and second electrode 192. The interval between the adjacent third electrode 271 and fourth electrode 272 may be less than about 6 µm. The width of the third electrode 271 and the width of the fourth electrode 272 may be substantially equal to or different from the interval between the adjacent third electrode 271 and fourth electrode 272.

In an exemplary embodiment, although not shown in the figure, a color filter may be further disposed on the first substrate 110 or the second substrate 210. Each color filter may express one of three primary colors, e.g., three primary colors of red, green and blue, or three primary colors of yellow, cyan and magenta. In such an embodiment, each pixel may rea mixed color of the primary colors or white as well as the primary colors.

In such an embodiment, the display device may further include a first polarizer 11 disposed outside the first display panel 100, and a second polarizer 22 disposed outside the second display panel 200.

Polarization axis of the first polarizer 11 and the second polarizer 22 may cross each other.

The liquid crystal layer 3 includes a plurality of liquid crystal molecules 31, and the plurality of liquid crystal molecules 31 are arranged substantially parallel to surfaces of the first substrate 110 and the second substrate 210 and are initially aligned in a predetermined direction. Accordingly, in a state in which the electric field is not applied to the liquid crystal layer 3, the liquid crystal molecules 31 are arranged in the predetermined direction.

The direction in which the liquid crystal molecules 31 are initially arranged may be substantially parallel to the polarization axis of one of the first polarizer 11 and the second polarizer 22, and may be substantially perpendicular to the polarization axis of the other of the first polarizer 11 and the second polarizer 22.

The liquid crystal layer 3 may have negative dielectric anisotropy or positive dielectric anisotropy.

Figure 8:
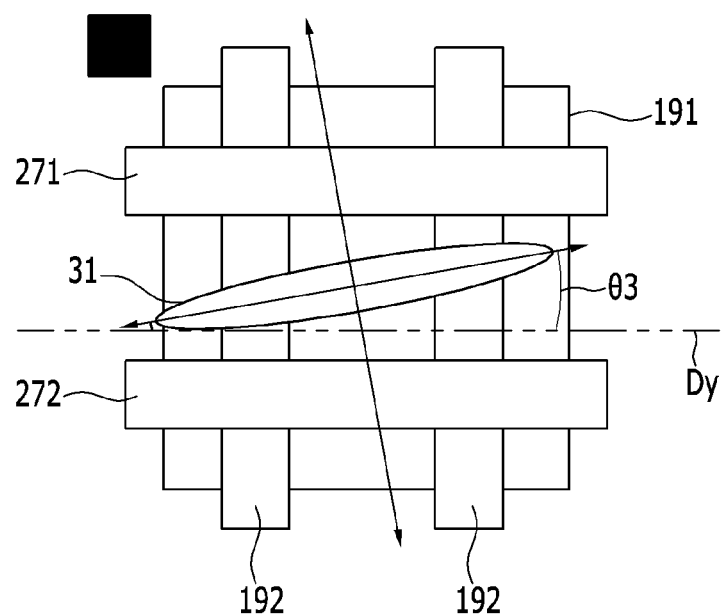
FIG. 8 to FIG. 10 are schematic views showing an exemplary embodiment of a driving method of the display device of FIG. 7.
Figure 9:
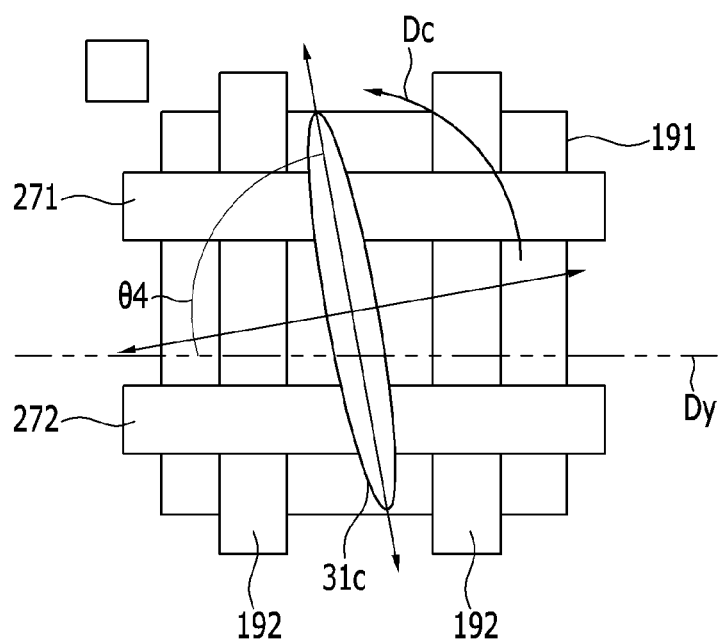
Figure 10:
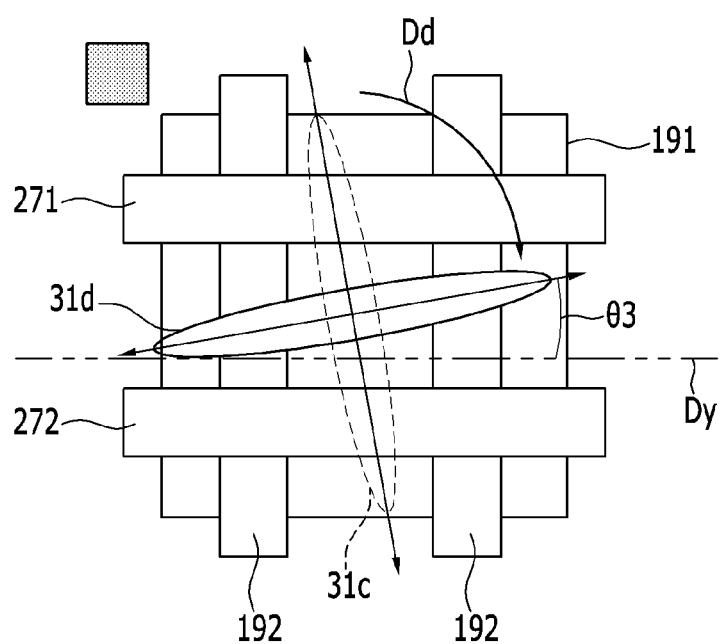

Next, an exemplary embodiment of a driving method of a display device shown in FIG. 7 will be described with reference to FIG. 8 to FIG. 10. FIG. 8 to FIG. 10 are schematic views showing an exemplary embodiment of a driving method of the display device of FIG. 7.

FIG. 8 shows a first off-state, e.g., an initial off-state. Referring to FIG. 8, the liquid crystal molecules 31 are aligned to form a third angle θ3 with the second direction Dy in which the third electrode 271 and the fourth electrode 272 of the second display panel 100 extend. As described above, the direction in which the liquid crystal molecules 31 are initially arranged may be substantially parallel to the polarization axis of one of the first polarizer 11 and the second polarizer 22 and may be substantially perpendicular to the polarization axis of the other of the first polarizer 11 and the second polarizer 22.

Accordingly, the light incident toward the first display panel 110 after passing through the first polarizer 11 is not transmitted through the liquid crystal layer 3 and the second polarizer 22 such that a black state is displayed.

Next, referring to FIG. 9, an on-state of the display device will be described.

In the on-state of the display device, the first electrode 191 is applied with a first voltage and the second electrodes 192 are applied with a second voltage. Magnitudes of the first voltage and the second voltage may be different from each other. In one exemplary embodiment, for example, the first voltage may be a pixel voltage, and the second voltage may be a common voltage. In an alternative exemplary embodiment, the first voltage may be the common voltage, and the second voltage may be the pixel voltage.

In the on-state, the third electrode 271 and the fourth electrode 272 of the second display panel 200 may be applied with the voltage of the predetermined magnitude, for example, the common voltage.

Referring to FIG. 9, when the first voltage and the second voltage having the different magnitudes are applied to the first electrode 191 and the second electrodes 192, a horizontal electric field is applied to the liquid crystal layer 3, such that the liquid crystal molecules 31 are rotated in the fifth direction Dc to form a fourth angle θ4 with the second direction Dy.

In an exemplary embodiment, where the liquid crystal molecules 31 have the negative dielectric anisotropy, the liquid crystal molecules 31 are rotated such that the direction of the longitudinal axis of the liquid crystal molecules 31 is substantially perpendicular to the direction of the electric field of the horizontal direction applied to the liquid crystal layer 3. In an exemplary embodiment, where the liquid crystal molecules 31 have the positive dielectric anisotropy, the liquid crystal molecules 31 are rotated such that the direction of the longitudinal axis of the liquid crystal molecules 31 is substantially parallel to the direction of the electric field of the horizontal direction applied to the liquid crystal layer 3.

As the liquid crystal molecules 31 are rotated, the light incident toward the first display panel 110 after passing through the first polarizer 11 is transmitted through the liquid crystal layer 3 and the second polarizer 22 such that a predetermined brightness is displayed.

Next, referring to FIG. 10, a second off-state of the display device will be described.

In a case of the second off-state of the display device, the third electrode 271 is applied with the third voltage and the fourth electrode 272 is applied with the fourth voltage. The magnitudes of the third voltage and the fourth voltage may be different from each other. The third voltage and the fourth voltage may be voltages having different polarities with reference to the common voltage. In the second off-state, the first electrode 191 and the second electrodes 192 may be applied with the voltage of the predetermined magnitude, for example, the common voltage.

Referring to FIG. 10, when the third voltage and the fourth voltage having the different magnitudes are applied to the third electrode 271 and the fourth electrode 272, the horizontal electric field is applied to the liquid crystal layer 3, such that the liquid crystal molecules 31 are rotated in the sixth direction Dd as a direction opposite to the fifth direction Dc to form the fourth angle θ4 with the second direction Dy, as the third liquid crystal molecule 31c is rotated toward the fourth liquid crystal molecule 31d.

The direction of the electric field formed by the third voltage and the fourth voltage applied to the third electrode 271 and the fourth electrode 272 is substantially perpendicular to the direction of the electric field formed by the first voltage and the second voltage applied to the first electrode 191 and the second electrodes 192. Accordingly, the liquid crystal molecules 31 are rotated in the direction opposite to that shown in FIG. 9. Accordingly, as the liquid crystal molecules 31 are rotated, the light incident toward the first display panel 110 after passing through the first polarizer 11 is not transmitted through the liquid crystal layer 3 and the second polarizer 22 such that the black state is displayed.

Figure 11:
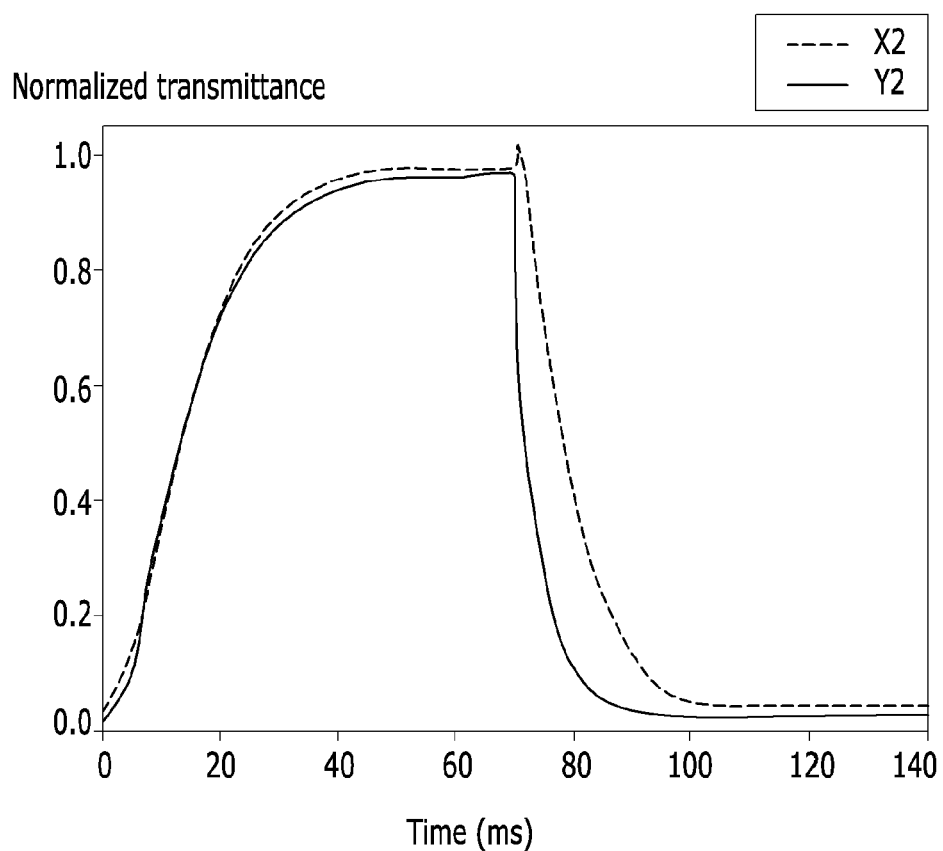
FIG. 11 is a graph showing a result of another experiment on a conventional display device and an exemplary embodiment of a display device according to the invention.

Next, an experiment on a conventional display device and an exemplary embodiment of a display device according to the invention will be described with reference to FIG. 11 and Table 2. FIG. 11 is a graph showing a result of another experiment on a conventional display device and an exemplary embodiment of a display device according to the invention, and Table 2 is a graph showing a result of a response time based on the experimental example.

In an experimental example, the response speed of a conventional display device, in which the first electrode and the second electrode overlapping each other via an insulating layer 80 are provided on the first display panel and electrodes are not provided on the second display panel, is compared with the response speed of an exemplary embodiment of a display device, in which the first electrode and the second electrode overlapping each other via the insulating layer 80 are provided on the first display panel and the third electrode and the fourth electrode are provided on the second display panel, and the results thereof are shown in FIG. 11.

In FIG. 11, X2 is the result of the conventional display device, and Y2 is the result of an exemplary embodiment of the display device according to the invention.

TABLE 2

|    | Turn-on time | Turn-off time |
|----|--------------|---------------|
| X2 | 25.3 ms      | 20.6 ms       |
| Y2 | 25.3 ms      | 10.0 ms       |

Referring to Table 2 and FIG. 11, in an exemplary embodiment of the display device according to the invention, compared with the conventional display device, the response time for changing the brightness from is the transmittance of zero (0) to a predetermined transmittance is substantially the same, and the response time for changing the brightness from the high transmittance to the transmittance of zero (0) is substantially reduced. That is, in an exemplary embodiment of the display device according to the invention, compared with the conventional display device, the response time is decreased, and thereby the response speed is increased. In an exemplary embodiment of the display device according to the invention, the turn-off time is substantially reduced compared with the conventional display device.

Figure 12:
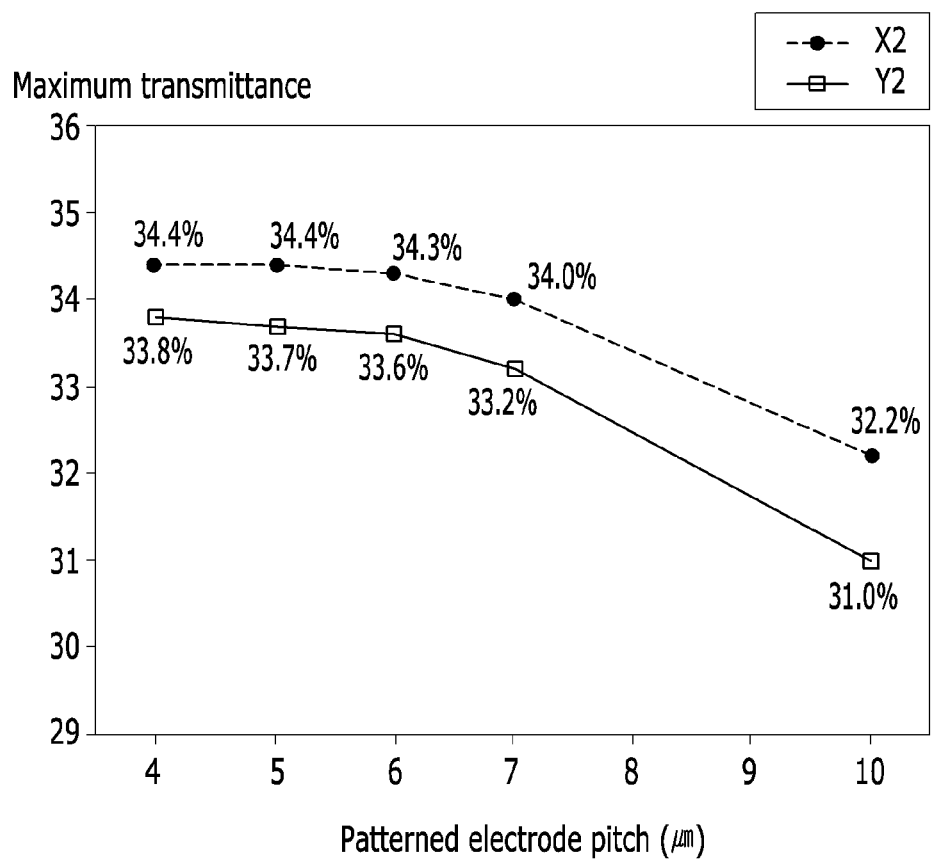
FIG. 12 is a graph showing a result of another experiment on a conventional display device and an exemplary embodiment of a display device according to the invention.

Next, another experiment on a conventional display device and an exemplary embodiment of a display device according to the invention will be described with reference to FIG. 12. FIG. 12 is a graph showing a result of another experiment on a conventional display device and an exemplary embodiment of a display device according to the invention.

In an experiment, a transmittance change of a conventional display device in which the first electrode and the second electrode overlapping each other via an insulating layer 80 are provided on the first display panel and electrodes are not provided on the second display panel, and a transmittance change of an exemplary embodiment of a display device according to the invention, in which the first electrode and the second electrode overlapping each other via the insulating layer 80 are provided on the first display panel and the third electrode and the fourth electrode are provided on the second display panel, are measured while controlling an interval between the electrodes.

Referring to FIG. 12, in an exemplary embodiment of the display device according to the invention, when the interval between the electrodes is less than about 6 μm, compared with the conventional display device, a maximum transmittance reduction of the display device is relatively small. That is, in an exemplary embodiment of the display device according to the invention, when the interval between the electrodes is less than about 6 μm, the maximum transmittance reduction of the display device compared with the conventional display device is substantially decreased or effectively minimized, while the response speed is substantially increased.

While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:
1. A display device comprising:
a first substrate;
a second substrate disposed opposite to the first substrate;
a first electrode disposed on the first substrate;
a second electrode disposed on the first substrate;
a third electrode disposed on the second substrate;
a fourth electrode disposed on the second substrate;
a liquid crystal layer between the first substrate and the second substrate and comprising a plurality of liquid crystal molecules; and
an insulating layer disposed on the first substrate,
wherein
the second electrode extends substantially in a first direction,
the third electrode extends substantially in a second direction,
the first direction and the second direction are perpendicular to each other,
the first electrode and the second electrode overlap each other via the insulating layer,
the first electrode has a plate shape,
the second electrode comprises a plurality of branch electrodes extending parallel to each other substantially in the first direction with a first interval therebetween, and
the third electrode and the fourth electrode extend parallel to each other substantially in the second direction with a second interval therebetween.
2. The display device of claim 1, wherein the first interval between two adjacent branch electrodes of the plurality of branch electrodes of the second electrode is less than about 6 micrometers.
3. The display device of claim 2, wherein
the second interval between the third electrode and the fourth electrode is less than about 6 micrometers.
4. The display device of claim 3, wherein
a width of the first electrode and a width of the second electrode are substantially equal to or different from the first interval, and
a width of the third electrode and a width of the fourth electrode are substantially equal to or different from the second interval.
5. The display device of claim 1, further comprising:
a first thin film transistor disposed on the first substrate; and
a second thin film transistor disposed on the second substrate,
wherein
at least one of the first electrode and the second electrode is connected to the first thin film transistor, and at least one of the third electrode and the fourth electrode is connected to the second thin film transistor.

6. The display device of claim 1, wherein
the liquid crystal molecules have negative dielectric anisotropy or positive dielectric anisotropy, and
the liquid crystal molecules are arranged substantially parallel to surfaces of the first substrate and the second substrate.

7. The display device of claim 6, further comprising:
a first polarizer disposed outside the first substrate; and
a second polarizer disposed outside the second substrate, wherein
when an electric field is not applied to the liquid crystal layer, a longitudinal axis of the liquid crystal molecules is arranged substantially parallel to a polarization axis of the first polarizer or the second polarizer.

* * * * *